(12) United States Patent
Rule

(10) Patent No.: US 11,104,063 B2
(45) Date of Patent: Aug. 31, 2021

(54) METHOD OF PROCESSING A SURFACE FOR ADDITIVE MANUFACTURING, COMPONENT AND APPARATUS

(71) Applicant: Siemens Aktiengesellschaft, Munich (DE)

(72) Inventor: David Rule, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 349 days.

(21) Appl. No.: 16/302,652

(22) PCT Filed: Jun. 1, 2017

(86) PCT No.: PCT/EP2017/063247
§ 371 (c)(1),
(2) Date: Nov. 18, 2018

(87) PCT Pub. No.: WO2017/215923
PCT Pub. Date: Dec. 21, 2017

(65) Prior Publication Data
US 2019/0126540 A1  May 2, 2019

(30) Foreign Application Priority Data

Jun. 13, 2016 (EP) ..................................... 16174165

(51) Int. Cl.
*B29C 64/153* (2017.01)
*B33Y 10/00* (2015.01)
(Continued)

(52) U.S. Cl.
CPC ............ *B29C 64/153* (2017.08); *B22F 12/00* (2021.01); *B24B 31/00* (2013.01); *B24B 31/006* (2013.01);
(Continued)

(58) Field of Classification Search
None
See application file for complete search history.

(56) References Cited

U.S. PATENT DOCUMENTS

| 4,823,513 A | 4/1989 | Marcus et al. |
| 10,634,440 B2 * | 4/2020 | Phillips .................... G01V 3/08 |

(Continued)

FOREIGN PATENT DOCUMENTS

| CN | 105258159 A | 1/2016 |
| DE | 10007962 C1 | 7/2001 |

(Continued)

OTHER PUBLICATIONS

EP search report dated Jan. 4, 2017, for EP patent application No. 16174165.7.

(Continued)

*Primary Examiner* — Matthew J Daniels
*Assistant Examiner* — Paul Spiel

(57) ABSTRACT

A method of processing a surface in additive manufacturing includes assembling a structure for a component by additive manufacturing out of a bed of a powdery base material, such that the structure is provided with an internal surface and a powdery base material covers at least a part of the internal (Continued)

surface, and actuating the base material relatively to the structure such that the internal surface is mechanically processed by the base material.

5 Claims, 2 Drawing Sheets

(51) Int. Cl.
*B33Y 30/00* (2015.01)
*B33Y 40/00* (2020.01)
*B24B 31/00* (2006.01)
*B29C 64/30* (2017.01)
*B24C 3/32* (2006.01)
*B24C 1/00* (2006.01)
*B24C 1/08* (2006.01)
*B22F 5/00* (2006.01)
*B22F 10/10* (2021.01)
*B33Y 80/00* (2015.01)
*B29C 64/245* (2017.01)
*B22F 12/00* (2021.01)
*B29C 64/255* (2017.01)

(52) U.S. Cl.
CPC ............... *B24C 1/00* (2013.01); *B24C 1/08* (2013.01); *B24C 3/325* (2013.01); *B29C 64/245* (2017.08); *B29C 64/255* (2017.08); *B29C 64/30* (2017.08); *B33Y 10/00* (2014.12); *B33Y 30/00* (2014.12); *B33Y 40/00* (2014.12); *B33Y 80/00* (2014.12); *B22F 5/009* (2013.01); *B22F 10/10* (2021.01); *Y02P 10/25* (2015.11)

(56) References Cited

U.S. PATENT DOCUMENTS

| | | | |
|---|---|---|---|
| 2007/0001342 A1 | 1/2007 | Oberhofer et al. | |
| 2015/0336233 A1 | 11/2015 | Twelves et al. | |
| 2015/0375359 A1* | 12/2015 | Cui | B24B 1/005 451/59 |
| 2016/0010863 A1 | 1/2016 | Ott et al. | |
| 2016/0074940 A1* | 3/2016 | Cote | B33Y 40/00 134/23 |
| 2016/0199959 A1* | 7/2016 | Volk | B29C 64/35 428/34.1 |
| 2016/0279871 A1 | 9/2016 | Huegel et al. | |

FOREIGN PATENT DOCUMENTS

| | | |
|---|---|---|
| DE | 102013223407 A1 | 5/2015 |
| EP | 2910362 A1 | 8/2015 |
| JP | 2004027329 A | 1/2004 |
| JP | 5477739 B2 | 4/2014 |
| WO | 0110631 A2 | 2/2001 |
| WO | 2007013240 A1 | 2/2007 |
| WO | 2015055601 A1 | 4/2015 |

OTHER PUBLICATIONS

International search report and written opinion dated Oct. 25, 2017, for PCT/EP2017/063247.

* cited by examiner

METHOD OF PROCESSING A SURFACE FOR ADDITIVE MANUFACTURING, COMPONENT AND APPARATUS

CROSS REFERENCE TO RELATED APPLICATIONS

This application is the US National Stage of International Application No. PCT/EP2017/063247 filed Jun. 1, 2017, and claims the benefit thereof. The International Application claims the benefit of European Application No. EP16174165 filed Jun. 13, 2016. All of the applications are incorporated by reference herein in their entirety.

FIELD OF INVENTION

The present invention relates to a method of processing, such as mechanically processing a surface, advantageously of an additively manufactured structure for a component and/or a method of additively manufacturing of the component. Further, the present invention relates to a corresponding component and an apparatus. The component is e.g. manufactured from a powdery base material.

The mentioned "component" may be any ceramic or metallic components or even a plastic component. Preferably, the component describes a component applied to or applicable in the flow path of turbo machines, such as gas turbines.

The term "additive" shall particularly denote a layer-wise, generative and/or bottom-up manufacturing technique. The additive manufacturing as described herein advantageously relates to powder-bed manufacturing methods.

BACKGROUND OF INVENTION

Powder bed manufacturing techniques such as selective laser melting (SLM), electron beam melting (EBM) or selective laser sintering (SLS) are relatively well known methods for fabricating, prototyping or manufacturing parts or components from a bed of e.g. a powdery or granular base material. Conventional apparatuses or setups for such methods usually comprise a build platform on which the component is built layer-by-layer after the feeding of a layer of the base material which may then be melted, e.g. by the energy of a laser beam and subsequently solidified. The layer thickness is determined by the operation of a wiper that moves, e.g. automatically, over the powder bed and removes excess material. Typical layer thicknesses of deposited powder layers amount to 20 µm or 40 µm. During the manufacture, said beam scans over the surface and melts the base material in selected areas which may be predetermined by a CAD-file according to the geometry of the component to be manufactured.

A method of additive manufacturing is known from EP 2 910 362 A1, for example.

Usually, components produced or being producible via powder bed manufacturing techniques are limited with respect to surface properties, e.g. as compared to components manufactured by means of stock or investment casting. Particularly, additively manufactured or built components have inherently rougher surfaces and/or a poorer surface quality as compared to conventionally manufactured components. Rougher surfaces, however, can cause problems with respect to heat transfer, gas flows, or crack sensitivity, e.g. during an intended operation of the component for example as part of the flow path hardware of turbines. The mentioned drawbacks particularly relate to internal surfaces or surfaces which are not easily accessible, e.g. accessible for post machining after the assembly or manufacture.

External surfaces of components manufactured additively can, on the other hand, be smoothened or machined in post-processing steps, such as machining or grit blasting, whereas complex cavities or internal surfaces, particularly internal cooling channels or other surfaces are very difficult to refine for the given reasons. Efforts to smoothen or refine said internal surfaces often result in clogged holes or openings and thus failure to remove excess base material from the corresponding cavity. Actually, there is almost no viable method for refining said internal surfaces and the mentioned disadvantages have to be accepted to a certain extend.

SUMMARY OF INVENTION

It is therefore an object of the present invention to provide means by which an improved additively manufactured component can be provided. Particularly, a novel method is presented for refining or processing internal surfaces and/or cavities of a structure or component which is to be manufactured, such as components manufactured by SLM for an application in gas turbine applications.

The mentioned object is achieved by the subject-matters of the independent claims. Advantageous embodiments are subject-matter of the dependent claims.

An aspect of the present invention relates to a method of processing of a surface for additive manufacturing. Preferably, the method pertains to mechanically processing of an inner or internal surface e.g. of a structure for the component. The method comprises assembling of the structure for a component, by additive manufacturing out of a bed of a powdery or granular base material, such that the structure comprises or is provided with an internal surface and the base material covers at least a part or parts of the internal surface. Expediently, the base material is the same base material as the one out of which the structure has been manufactured. Thus, the base material may inherently or automatically be present on the internal surface or retained in a cavity, e.g. defined by the internal surface.

The term "structure" advantageously may denote an additively manufactured part or section of the component or the readily manufactured component as a whole.

The method further comprises actuating the base material relatively to the structure (or vice versa) such that the internal surface is mechanical, advantageously abrasively, processed or machined, by the base material.

The described actuation advantageously pertains to a vibratory, swirling or oscillatory actuation or movement. Said actuation may additionally or alternatively pertain to a refinement of the internal surface which may include ablation and/or polish of the surface.

In an embodiment, the actuation is carried out in an according apparatus. Prior to the actual actuation, the provided structure may therefore be mounted or fixed to the apparatus in order to perform the actuation (see below).

Said base material may particularly comprise a fine fraction, such as a fine powder, e.g. with an average particle diameter of e.g. few tens of micrometers as well as a coarser granular fraction which may be formed from solidified and/or conglomerated powder particles.

Said processing may relate to machining, grinding, refining or further or different frictional or abrasive treatment between the base material and the internal surface (or vice versa).

The presented approach for processing or machining of the internal surface is novel and enables a machining of inner or internal surfaces of additively manufactured material. As an advantage, the mentioned drawbacks caused by an inherent roughness of the solidified material of the as-manufactured structure or component can be overcome.

Particularly, surface roughness currently strongly affects oscillation stability of additively manufactured components, wherein particularly the depth roughness may be crucial. An increase in the long-term (oscillation) stability of a majority of additively manufactured or prototyped parts may be achieved e.g. by improving surface roughness or smoothening. Particularly inner or internal surfaces of these are not or almost not susceptible to post-machining. This aspect is particularly crucial due to the ever increasing importance of additively manufacturing, particularly in the fabrication of high-performance materials and components, such as thermally highly stressed turbine components. Thus, in order to ensure an acceptable thermal stability, stress susceptibility and product lifetime, there is the stringent need for the improvement of surface properties in additive manufacturing.

Moreover, e.g. a cooling efficiency of turbine components can be significantly improved, as gas flows with improved flow dynamics can be guided through the internal surfaces of cooling channels or other passageways, for example.

Furthermore, there are no concerns of contamination of the component as the abrasive or machining agent or means is or is presented by the (original) base material. This issue is particularly crucial for the manufacture of components manufactured of superalloys, such as nickel or cobalt-based superalloys of highest performance, wherein traces of contaminants may destroy the necessary microstructure and/or material properties in terms of susceptibility to cracking, rupture or creep stress.

Due to the mentioned actuation of the base material, said base material advantageously (abrasively) moves over or relative to the internal surface of the structure and/or component, wherein, at the same time, the removal of the base material—which is also crucial to the surface quality and e.g. for the functionality of the internal surface—may be facilitated.

The structure comprises a cavity being defined by the internal surface, wherein the base material is retained in the cavity. Accordingly, the base material is advantageously in contact or communicating with the internal surface and/or the space.

After and/or during the actuation, the base material is at least partly removed from the cavity.

The base material is firstly actuated at a first frequency (first actuation) and—after the first actuation of the base material or the actuation at the first frequency—the base material is actuated at a second frequency (second actuation) being different from the first frequency, wherein the second frequency is chosen such that the base material, advantageously the fine powdery fraction as well as the granular fraction of the same, is at least partly removed from the cavity.

In an embodiment, the first frequency is tuned according to abrasive properties of the base material, such as the hardness of the base material.

In an embodiment, the second frequency is tuned according to material, particularly material properties such as the hardness or further abrasive properties of the structure, and a geometry of the structure, such as an exact shape and dimension of the cavity which may be known from construction data, such as CAD data for/of the respective manufacture.

In an embodiment an orientation of the structure in space is further chosen such that said base material is at least partly, advantageously almost completely, removed from the cavity.

Preferably, the base material is indeed removed completely or almost completely from the cavity, as this may improve the performance of the component for the intended purposes such as improve the cooling efficiency in the case of turbine components.

The applied frequencies of the actuation are advantageously adjusted such that, at first, the internal surface can be machined in an efficient way and, secondly, that the base material as machining medium may afterwards easily be removed.

The actuation shall provide the component with a refined, surface comprising improved (desired) surface properties.

In an embodiment, the second frequency is lower than the first frequency. This is particularly expedient, as a removal of the base material from the cavity may require a lower frequency range, e.g. a frequency range of only a few Hz or even less than 1 Hz.

In an embodiment, the first frequency is or is selected out of a first frequency range.

In an embodiment, the second frequency is or is selected out of a second frequency range.

In an embodiment, an orientation of the structure, e.g. an orientation in space, is varied during and/or after the actuation of the base material, e.g. after the mentioned first actuation and during the mentioned second actuation. This may allow for an improved removal of the base material from the internal surface and/or the cavity, e.g. in case that the internal surface comprises a intricate and/or complex geometry, whereof the base material can hardly be removed, when the actuation is performed only at a single spatial orientation of the structure or the component.

In an embodiment, the cavity comprises at least one opening. In most component application, this is expedient or necessary for the intended purpose of the cavity. E.g. in many turbine components, cavities serve the purpose of being flown through by a fluid for cooling the component.

In an embodiment, the cavity comprises two openings.

In an embodiment, a fluid or pressure blast, such as an abrasive blast, is guided through the opening(s), e.g. from an outside of the cavity such that the internal surface is mechanically processed by the base material.

An actuation by means of the mentioned pressure blasts or air blasts may enhance or facilitate the mechanical processing of the inner surface. This embodiment of the method may be carried out additionally to an actuation of the base material by means of vibration as mentioned above.

In an embodiment, an orientation of the structure in space is varied during the actuation of the base material. Accordingly, regions of the internal surface which are currently to be machined may be switched such that different partial surfaces being declined with respect to each other may be e.g. machined consecutively.

In an embodiment, during the movement of the structure at the first frequency, an opening of the cavity is oriented facing upwards such that base material is reliably retained in the cavity and does particularly not escape therefrom.

In an embodiment, after the additive manufacture, the cavity is at least partly sealed or closed, e.g. by a seal or closure. This may be performed by any suitable means known to a skilled person, expediently after the additive manufacture. Said seal or closure may be or comprise a glue or a porous structure. Thereby it is advantageous, that said seal can be released or removed after the actuation and such that the closure or seal may easily be applied.

In an embodiment, the method comprises—after the actuation or the movement of the structure at the first frequency (first actuation)—opening or unsealing of the cavity such that the base material can at least partly be removed from the cavity, advantageously removed completely.

A further aspect of the present invention relates to a method of additive manufacturing, e.g. comprising the method of processing.

In an embodiment, the structure either constitutes the component or the structure or its manufacture is completed to provide the component by further or additional additive buildup or assembly.

In an embodiment, the component or an additive manufacture thereof is completed, expediently by means of an additive manufacturing technique such as selective laser melting, wherein, afterwards, the base material is at least partly removed from the cavity.

In an embodiment, the method comprises—after the additive manufacture—and, expediently, prior to any closing of the cavity, introducing a (further) machining or abrasive means, e.g. comprising a fluid, into the cavity. Said machining fluid may comprise any liquid or gaseous medium. Preferably, the machining fluid is or comprises a liquid which may comprise a further abrasive medium, besides the base material as described.

In an embodiment, the machining fluid is a fluid known in the field of ultrasonic machining.

In an embodiment, the method comprises applying ultrasound to the structure and/or the base material, e.g. during actuation.

A further aspect of the present invention relates to a component which is or can be manufactured e.g. out of the structure, wherein the component comprises an accordingly processed internal surface.

A surface roughness of the internal surface of the as-manufactured component is less than 60 µm, or even less. Such surface roughness denotes a range which is usually not achievable by conventional additive manufacturing techniques. Said surface roughness may denote a mean (surface) roughness, depth of roughness, a mean square roughness or a (arithmetical) mean roughness index.

In an embodiment, the internal surface of the readily manufactured component comprises surface features with a feature size of less than 100 µm, advantageously less than 80 µm. The mentioned features advantageously denote features of an intended and accordingly designed geometry, wherein said features may advantageously already be present in an according CAD and/or CAM model for the component.

A further aspect of the present invention relates to an apparatus for the additive manufacture of the component comprising an actuation means for actuating the base material relative to the structure or directly the structure at a predefined frequency or frequency range. The mentioned frequency range may comprise the above-mentioned first frequency (range) as well as the second frequency (range).

In an embodiment, the apparatus is construed to perform a particularly powerful and rapid actuation, in order to achieve a machining effect with the base material as described. Moreover, the apparatus is advantageously configured robust in order to provide the apparatus with an acceptable product lifetime.

The apparatus further comprises a fixing means such as a fastener for fixing the component, wherein the fixing means is configured to vary an orientation of the structure.

This may ease or enable the powder removal at all, if it pertains to a structure of possible convoluted or intricate inner spaces of the structure.

Advantages relating to the described method may as well pertain to the described component and apparatus and vice versa.

BRIEF DESCRIPTION OF THE DRAWINGS

Further features, expediencies and advantageous refinements become apparent from the following description of the exemplary embodiment in connection with the Figures.

FIG. 1 shows a schematic sectional view of a setup of a structure which is to be manufactured.

FIG. 2 shows a schematic sectional view of the setup of FIG. 1, in which a cavity is sealed.

FIG. 3 shows a schematic sectional view of the setup of the previous Figures, wherein an internal surface of the structure is or has been mechanically processed.

FIG. 4 shows a schematic sectional view of the setup of FIG. 3 at a varied orientation.

DETAILED DESCRIPTION OF INVENTION

Figure 1:
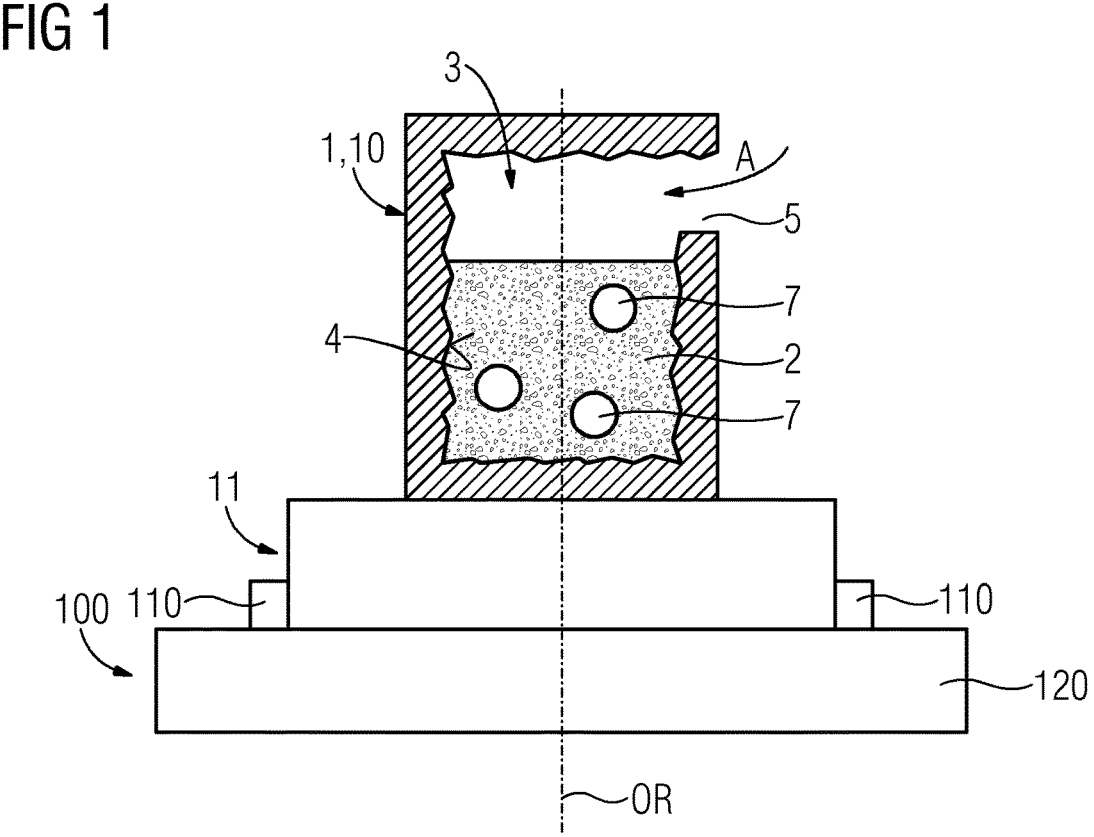
FIGS. 1 to 4 indicate different method steps of a method of processing a surface of a structure or component in additive manufacturing according to the present invention.

Like elements, elements of the same kind and identically acting elements may be provided with the same reference numerals in the Figures.

FIG. 1 shows an apparatus 100. The apparatus 100 advantageously relates to a tool or add-on for the additive manufacture of a component 10 or structure 1, advantageously by powder-bed based-techniques. In FIGS. 1 to 4, the apparatus 100 is indicated simplified and only partly.

An additive manufacturing method as described herein advantageously relates to a selective laser melting or electron beam melting, wherein a powdery base material (cf. numeral 2 below) is solidified layer-wise, e.g. by a laser or electron beam (not explicitly indicated in the Figures) in order to build or manufacture the structure for the component.

The component 10 is advantageously a component for an application in flow path hardware of turbo machines, such as gas turbine. The component 10 is advantageously manufactured from superalloys, such as nickel or cobalt-based superalloys for gas turbines. A base material 2 for the structure 1 is selected accordingly.

The structure 1 may constitute the component. Alternatively, the structure 1 may denote only a part of the whole or readily manufactured component 10. The structure 1 and the component 10 may be referenced synonymously.

The apparatus 100 comprises fixing means 110. The fixing means 110 may be or comprise a fastener such as a bench vice, for fixing the component 10, advantageously after the structure 1 has been (so far) additively assembled or manufactured.

The fixing means 110 may comprise at least two clamps as indicated in the Figures. Also, the fixing means may comprise any expedient fixation features known to a skilled person, such as a clutch, grippers, an arbor or mandrel, screws, bolts, a caliper, or any other means suitable for fixing the component, advantageously according to a plurality of different spatial orientations (cf. FIG. 4).

Further, the apparatus 100 comprises an actuation means 120, such as vibration or oscillatory means. The actuation means 120 is advantageously configured such that a structure of the component and/or the component may be actuated to a periodic actuation, such as a vibration or oscillation at a predefined frequency range. Said frequency range advantageously encompasses a first frequency F1 or frequency range and a second frequency F2 or frequency range.

The actuation means 120 is expediently provisioned for an actuation of the base material 2 relative to the structure 1 (or vice versa) for processing, machining or refining of an internal surface of the structure (cf. below).

FIG. 1 shows the apparatus 100 according to an orientation (cf. dashed line indicated with numeral OR). The fixing means 110 effects a fixation of the component 10 on or at e.g. the actuation means 120 and/or further parts of the apparatus 100.

The component 10 comprises a base section 11. Accordingly, the component 10 is advantageously an at least partly hollow component of a gas turbine, such as a turbine airfoil, vane or blade, which is advantageously to be additively provided with an internal cavity. Said cavity may serve as a cooling channel for an efficient cooling of the component e.g. during an operation of the turbine. An internal space, or cavity is accordingly denoted by numeral 3 indicating exemplarily e.g. the mentioned cooling channels.

Alternatively, other passageways (apart from cooling channels) may be represented by cavity 3.

The base section 11 may be a root section of the turbine blade.

The component 10 further comprises an inlet or opening 5 by means of which an outside of the component 10 may communicate with the cavity 3.

In FIG. 1, the cavity 3 or space is shown at least partly filled with the base material 2, advantageously of powdery and/or granular structure. The structure 1 and/or the component 10 has advantageously been manufactured of the same base material, wherein the base material remaining in the cavity may be an excess base material, advantageously remaining from the manufacture. In other words, the base material 2 has advantageously not been inserted, e.g. through the opening 5 into the cavity 3 but has been trapped therein during the additive manufacture.

The component 10 further comprises an internal surface 4. The internal surface 4 is or comprises a certain roughness as indicated by the "zigg-zagged" or un-even morphology. Said morphology may be un-desired and inherently present to the respective additive manufacturing technique. Particularly the selective laser melting technique (SLM)—though allowing for a plurality of advantages—usually only features a poor surface quality, which may at least be insufficient for internal cooling channels for an application in turbine airfoils, which can usually not be post-processed.

It is further shown in FIG. 1 that—besides the powdery base material 2—base material clusters 7 may be provided in the corresponding powder bed in the cavity 3. Said clusters 7 may be formed by weld spatter. Exemplarily, a number of three clusters 7 is shown in the Figures. Alternatively, only one cluster may be provided or a plurality of clusters, such as five or ten clusters, or even more.

Said clusters 7 and/or the advantageously powdery, base material 2 may be designed to mechanically process the internal surface 4 in terms of ablation or machining, polish and/or refinement.

The arrow referenced with numeral A shall indicate that air or pressure blasts may be guided or introduced through the opening 5 into the cavity 3 such that e.g. the base material 2 is swirled around and thus effects an abrasive machining or processing of the internal surface 4. To this effect, the actuation means may be abrasive blasting means.

The arrow A may as well indicate that an (additional) machining or blasting means may be introduced according to the concept of the present invention. Said means may comprise a machining fluid for driving the machining, e.g. by blasting and/or a further abrasives, such as sand or glass beads which may ease or support the processing or mechanical refinement of the internal surface 4 such that the desired surface roughness can be achieved. The mentioned fluid may be gaseous or liquid. E.g. said fluid may be known in the field of ultrasonic machining. Further, the presented method may accordingly comprise applying ultrasound to the structure and/or the base material, e.g. for an actuation.

Figure 2:
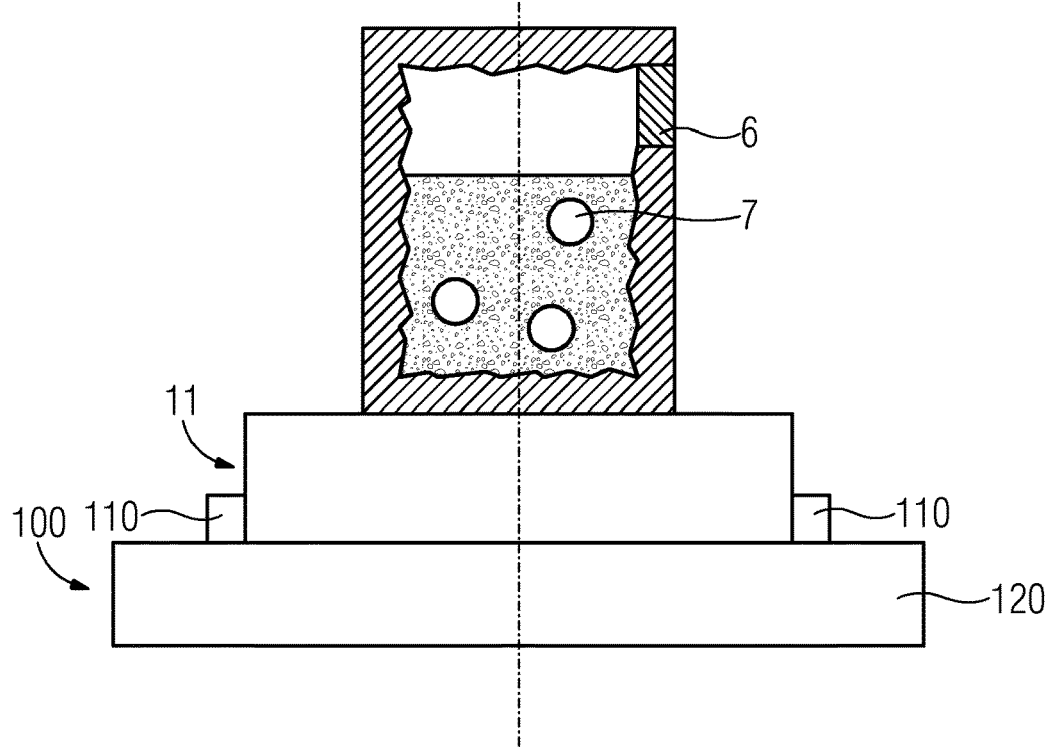

FIG. 2 shows the setup of FIG. 1, i.e. the apparatus 100 as well as the component 10 fixed to the apparatus 100, wherein the mentioned opening 5 has been closed or sealed by a closure 6. The closure 6 may be a seal, such as a glue or a porous material by means of which the cavity 3 is advantageously made powder-tight and/or closed such that base material 2 cannot escape from the cavity, even though the setup is flipped or an orientation thereof is varied (cf. FIG. 4).

The sealing may be performed by any means known to a skilled person. Preferably, the sealing is performed such that the closure 6 can easily be released afterwards, e.g. after the actuation of the structure relative to the base material 2.

Figure 3:
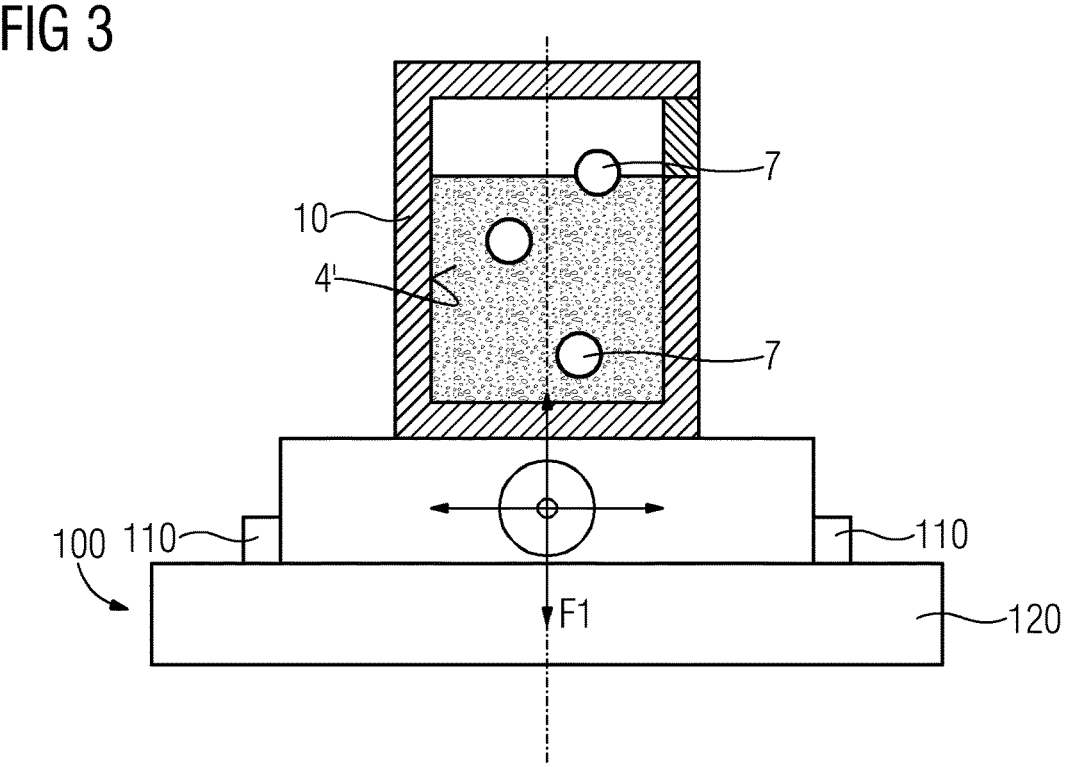

FIG. 3 indicates, as compared e.g. to FIGS. 1 and 2, that the "rough" internal surface has been mechanically processed and refined, such as abrasively grinded or polished, wherein the roughness or surface quality has been improved. Consequently, a particularly refined and/or improved internal surface 4' has been generated and/or provided which allows for an improved performance of the component in its intended operation, such as an improved cooling efficiency due to a smoothened internal surface geometry (cf. above).

The internal surface 4' of the as-manufactured component may—though not being indicated in the Figures—comprises surface features with a feature size of e.g. down to 100 µm or less, such as 80 µm or even less. The mentioned features advantageously denote features of an intended and accordingly designed geometry, wherein said features may advantageously already be present in an according CAD and/or see a model for the component 10. Said features may pertain to swirlers or turbulators, for example, wherein the turbulators may effect turbulation and improvement of cooling efficiency in the readily manufactured turbine component.

The revealed processed internal surface 4' is advantageously refined, improved or processed such that it provides a surface roughness or mean roughness index of less than 100 µm, advantageously less than 60 µm or even less. The component 10 and/or the structure 1 may—when treated by the presented refinement and/or manufacturing method, reveal a surface roughness or roughness depth of only 15 µm. This may particularly denote a surface quality which cannot be achieved by conventional additive manufacturing processes.

A vibratory actuation is indicated particularly by means of the crossed arrows of FIG. 3, indicating that the described setup or structure may be actuated periodically, advantageously at the first frequency F1. Consequently, the component 10 or the base material 2 trapped in the cavity 3 is advantageously agitated or moved periodically. Due to the actuation and/or vibration, and the inertia of the base material 2 is swirled around inside the cavity 3, whereby the internal surfaces 4 are machined and the refined internal surface morphology 4' is revealed.

Although this is not explicitly indicated in the Figures, the presented inventive method may comprise the application and/or adjustment of any expedient or reasonable frequency or frequency range (cf. above). Said frequency may for example be known or easily determined by experimentation of a skilled person.

The mentioned first frequency or first frequency range may particularly depend on a powder particle fraction of the base material and/or the hardness of the individual powder particles.

The method may further comprise variation of the orientation OR of the setup, such that different internal surface sections, which may be inclined with respect to each other may efficiently be processed.

In case that the described opening 5 of the cavity is not already facing upwards, such that the base material is trapped inside, the method may comprise changing the orientation of the setup such that the opening is directed upwards. In this case, the process step of sealing the opening 5 may be dispensed.

Apart from the indication in the Figures, the structure 1 may be manufactured such that, it comprises more than one opening, such as two or more openings, e.g. at opposing sides of the structure or at the top side thereof. A plurality of openings is particularly expedient in case of abrasive blasting for the actuation.

Figure 4:
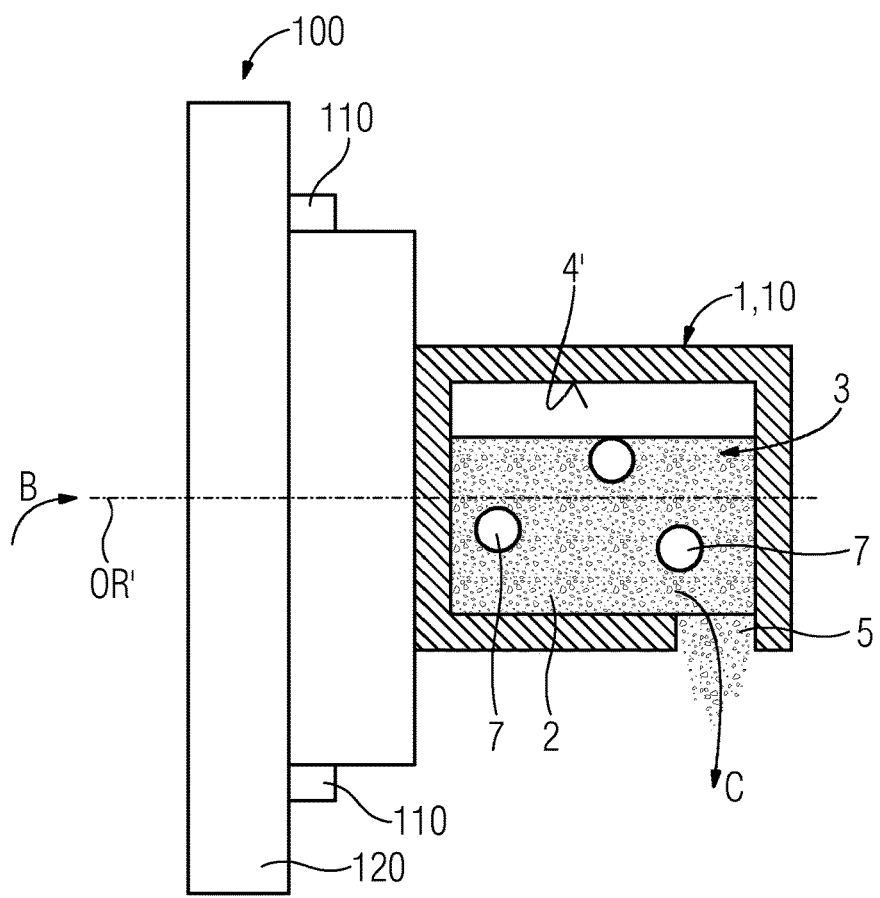

FIG. 4 indicates schematically a step of the present method, in which, as compared to the described Figures as yet, the setup has been turned or rotated (cf. arrow B); in the present case e.g. 90° in a clockwise sense, i.e. from the orientation OR to OR'. A plurality of further—possibly different—orientations may be applied to the component or the setup during actuation.

Further, the closure 6 has been removed at least partly such that the base material inside the cavity 3 has or can be removed from the cavity 3 (cf. arrow C). The clusters 7 may be removed through the opening as well. The continuous line shown across the opening 5 in FIG. 4 merely indicates a contour of the cavity 3 and/or a situation in which no base material 2 has yet been removed from the cavity.

The opening(s) 5 may be partly or completely closed prior to the described actuation. After the actuation, the openings may be unsealed in order to remove the base material 2.

For an efficient removal of the base material after the step of mechanical processing, it may be necessary to apply a further vibration or agitation to the setup, particularly to the structure. Said vibration or further movement or actuation may as well be applied by the actuation means 120. Particularly, a second frequency F2 or frequency range may be applied to the structure for or during the removal of the base material 2 from the cavity 3.

Preferably, the mentioned second frequency is smaller than the first frequency.

The first frequency of frequency range F1 may comprise frequencies from several kHz to e.g. 1 Hz.

The second frequency F2 may comprise the same frequencies or frequency range, i.e. F2 may equal F1. Preferably, however, the second frequency is chosen lower than the first frequency, such that the base material may efficiently be removed from the cavity 3. It may be provisioned, that within the actuation of the structure 1 relative to the base material 2 at the second frequency F2, the whole setup and/or the structure 1 is only actuated very slowly, but advantageously with a fairly large amplitude or momentum from one position to another.

The second frequency F2 may amount to mHz (miliHertz) only, wherein the whole setup may be turned to a variety of spatial orientations according to the present invention (cf. below).

Preferably, the presented method allows—in this way—for a complete removal of the base material from the cavity as shown in Figures.

The first frequency and/or the second frequency may advantageously tuned particularly to the intended purposes of the respective actuation, i.e. the machining of the internal surface 4 and/or the removal of the base material 2 from the cavity 3. Particularly, the actuation, e.g. the mentioned first and second frequencies(s) may be tuned according to the abrasive properties of the base material 2 or particle fraction thereof and/or to the material, geometry and/or accepted surface properties of the structure.

Although not indicated in the Figures, the described additive manufacturing method may describe further buildup or manufacture steps after the base material has been used for the refinement of the internal surface 4, 4' and/or the base material 2 has been removed from the cavity 3.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A method of processing a surface for additive manufacturing comprising:
    assembling a structure for a component by additive manufacturing out of a bed of a powdery base material, such that the structure is provided with an internal surface and the powdery base material covers at least a part of the internal surface, and
    actuating the base material relatively to the structure such that the internal surface is mechanically processed by the base material, wherein the structure comprises a cavity being defined by the internal surface,
    for the actuation, forming a seal by a closure so that the cavity is closed,
    wherein the base material is retained in the cavity,
    wherein, after the actuation, the base material is removed from the cavity, and,
    wherein the base material is firstly actuated at a first frequency and, after this first actuation of the base material, the base material is actuated at a second frequency being different from the first frequency, wherein the second frequency is chosen such that the base material is removeable from the cavity.

2. The method according to claim 1, wherein an orientation of the structure in space is varied during the actuation of the base material.

3. The method according to claim 1, wherein the first frequency is tuned according to abrasive properties of the base material and the second frequency is tuned according to a material and a geometry of the structure.

4. The method according to claim 1, wherein the second frequency is lower than the first frequency.

5. The method according to claim 1, further comprising, after the first actuation of the base material, opening of the cavity such that the base material is removeable from the cavity.

* * * * *